United States Patent [19]
Hurst

[11] 3,724,738
[45] Apr. 3, 1973

[54] RIVET SETTING APPARATUS
[75] Inventor: Thomas P. Hurst, Wayne, Ill.
[73] Assignee: Illinois Tool Works Inc., Chicago, Ill.
[22] Filed: Aug. 19, 1970
[21] Appl. No.: 65,206

[52] U.S. Cl. ..................227/147, 29/432.2, 29/509, 29/522, 72/391
[51] Int. Cl. ............................................... B25c 7/00
[58] Field of Search.............29/509, 522, 432, 432.2; 72/391; 227/147, 111

[56] References Cited

UNITED STATES PATENTS

| 1,164,086 | 12/1915 | Gooding | 227/147 X |
| 1,222,129 | 4/1917 | Palkowski | 227/147 X |
| 1,284,815 | 11/1918 | Taylor | 227/147 |
| 2,563,479 | 8/1951 | Miles | 227/147 |
| 3,442,112 | 5/1969 | Abromavage et al. | 72/391 |

FOREIGN PATENTS OR APPLICATIONS

| 123,478 | 12/1948 | Sweden | 227/147 |

Primary Examiner—Charlie T. Moon
Attorney—Olson, Trexler, Wolters & Bushnell, Robert W. Beart, Michael Kovac and Jack R. Halvorsen

[57] ABSTRACT

The present invention relates generally to improvements in apparatus and methods for driving and setting a work piercing fastener rivet, and more particularly to simplified and very practical apparatus and methods for driving and setting rivets of the type comprising a shank expanding pin member associated with a headed rivet shank having an expandable entering extremity. The embodiment of the invention disclosed herein includes an elongate shiftable driving tool for causing a rivet to pierce a workpiece. A longitudinal chamber within the tool communicates at one extremity with a pin accommodating aperture. Abutment means spaced axially from said aperture is adapted to engage a pin driving member freely shiftable longitudinally within the chamber. Kinetic energy resulting from sudden interruption of the driving movement of the tool upon complete insertion of the rivet member within the workpiece serves to cause the rivet expanding pin to move forwardly and expand the entering extremity of the rivet member.

5 Claims, 4 Drawing Figures

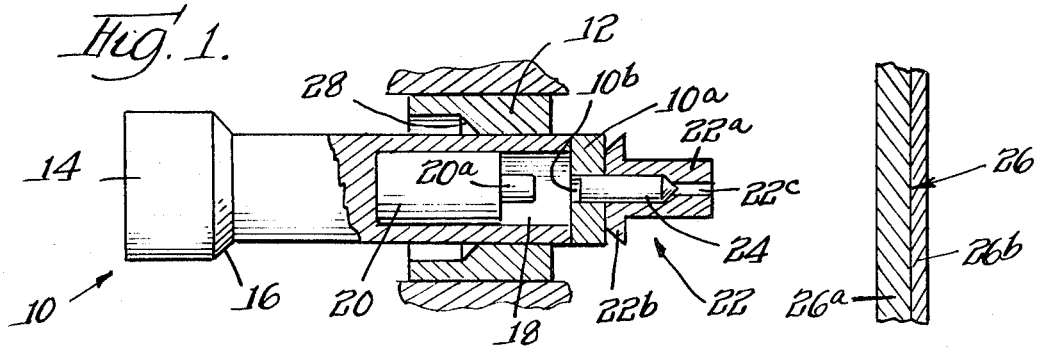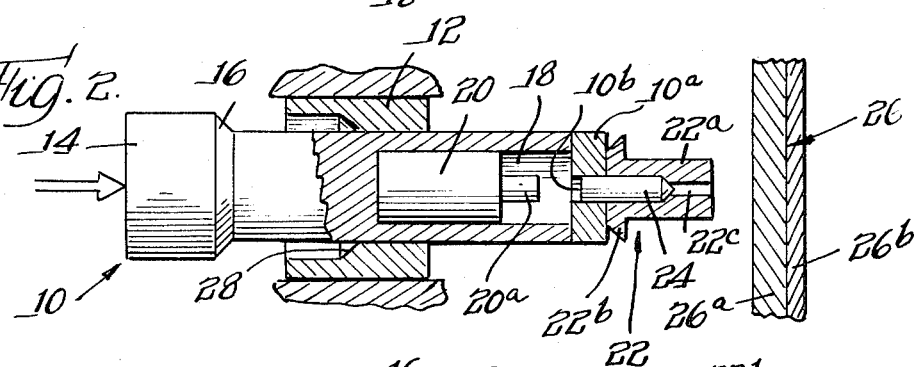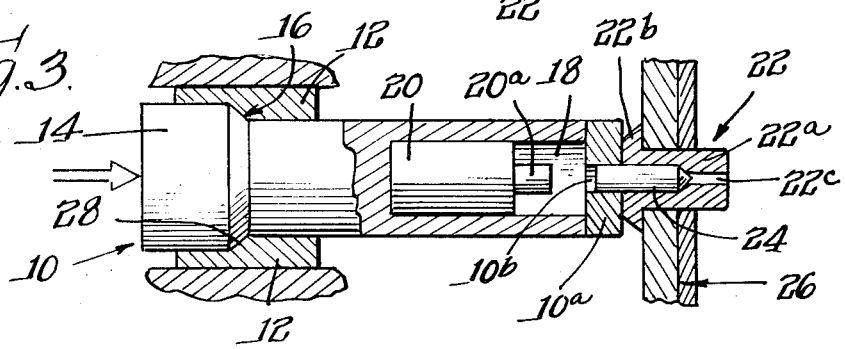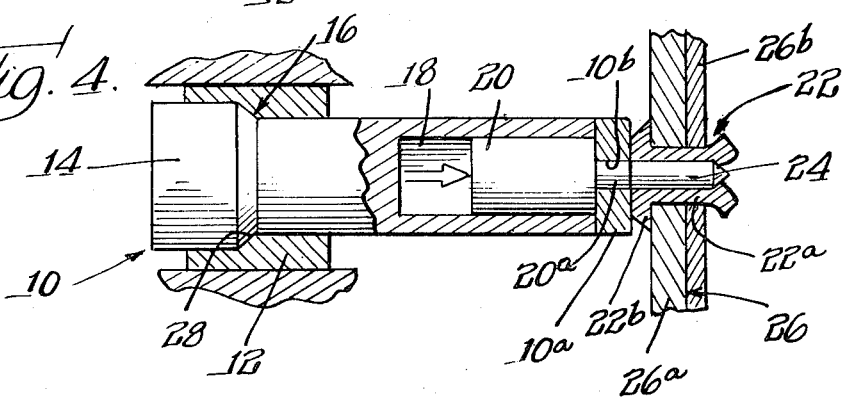

RIVET SETTING APPARATUS

SUMMARY OF THE INVENTION

Various types of manually operated power devices have been employed to impel a tool member into engagement with a rivet head to force the rivet through a workpiece. In such power devices it has been common practice to employ auxiliary power means such as hydraulic or mechanical power means for driving a rivet expanding pin into the rivet after the rivet has been completely inserted within a workpiece. The present invention is concerned primarily with the provision of a simplified arrangement whereby a rivet expanding pin may be driven into a complementary rivet without the necessity of employing auxiliary power devices or means of the type heretofore available.

More specifically, the present invention contemplates improved apparatus and methods for driving and setting a work-piercing fastener rivet device of the type comprising a shank expanding pin associated with a headed rivet shank having an expandable entering extremity, wherein the kinetic energy resulting from the sudden interruption of the movement of a rivet driving tool will cause a rivet expanding pin to move forwardly and expand the entering extremity of the rivet member.

The present invention contemplates apparatus and methods of the type set forth above wherein a freely shiftable driving member associated with a rivet driving tool member will, upon the sudden interruption of the forward driving movement of said tool, cause an associated rivet expanding pin to be moved forwardly and expand the entering extremity of a rivet member.

BRIEF DESCRIPTION OF THE DRAWING

The foregoing and other objects and advantages will be more apparent from the following detailed description when considered in connection with the accompanying drawing wherein:

FIG. 1 is an elevational view, shown partly in section, of a rivet driving and setting tool constructed in accordance with the teachings of the present invention, an expandable type rivet and associated rivet expanding pin being disclosed in association with advancing extremity of the tool, in readiness to be shifted toward a workpiece;

FIG. 2 is a view similar to FIG. 1, disclosing the tool as it initially advances the rivet toward the workpiece;

FIG. 3 is a view similar to FIGS. 1 and 2, disclosing the rivet as it perforates the workpiece; and, FIG. 4 discloses the forward position of the freely shiftable pin driving member within the tool chamber, said pin driving member having moved forwardly as an incident to momentum or kinetic energy which is brought into play when the forward movement of the tool member is suddenly interrupted.

DESCRIPTION OF A PREFERRED EMBODIMENT

Referring now to the drawing more in detail when like numerals have been employed to designate similar parts throughout the various views, it will be noted that the present invention contemplates an elongate, longitudinally shiftable tool designated generally by the numeral 10. The tool 10 is adapted to be used in association with a manually operable power device of the general type illustrated in the patent to Haley U.S. Pat. No. 3,150,488. It is not necessary for a clear understanding of the present invention to disclose the structural details of the manual power device or gun with which the tool 10 may be associated. It will suffice to state that the elongate tool 10 is longitudinally shiftable within a bearing member 12 of the power device (not shown). The driven extremity of the tool 10 is provided with an enlargement or head 14 which presents an annular inclined or conical abutment surface 16.

The tool 10 is provided with an elongate cylindrical chamber 18 for accommodating a longitudinally shiftable pin driving member 20. The advancing or driving extremity of the cylindrical member 20, is of reduced diameter to provide a section 20a. The advancing or driving extremity of the tool 10 is provided with an annular rivet head engaging section 10a. The annular section 10a is provided with a central aperture 10b which is in coaxial alignment with, and is adapted to telescopically accommodate the cylindrical section 20a.

A rivet device of the type adapted to be accommodated and acted upon by the tool 10 is designated generally by the numeral 22. The rivet device 22 includes a rivet shank 22a having a head 22b. The rivet device 22 also includes a shank expanding pin member 24. In the disclosed embodiment the pin 24 is preassembled with the rivet shank 22a with a portion thereof projecting axially beyond the rivet head 22b. The driving extremity of the pin 24 is preferably pointed, the apex thereof registering with a longitudinal rivet aperture 22c of reduced diameter. In instances where desirable, the pin and rivet may be formed integral. It has heretofore been common practice to form such integral rivet devices of molded plastic material.

From the foregoing it will be apparent that the rivet device 22 may be assembled with the driving extremity of the tool 10 by inserting the outwardly projecting portion of the rivet expanding pin 24 within the tool aperture 10b. Force is then applied to the tool 10 by a suitable power device (not shown) in the direction indicated by an arrow in FIG. 2. As previously mentioned it is not uncommon for power devices such as riveting guns to be hydraulically or pneumatically actuated to move the tool 10 with the rivet device 22 associated therewith toward a workpiece or panel 26.

For purposes of illustrating one practical application the workpiece 26 is shown as consisting of two sheets 26a and 26b. In FIG. 3 the tool 10 and the rivet device associated therewith have been advanced toward the workpiece 26 sufficiently to cause the rivet shank 22a to pierce the worksheets 26a and 26b. As the rivet completes its piercing association with the workpiece, the annular abutment surface 16 of the tool moves into engagement with a complementary abutment 28 formed in the fixed member or collar 12 of a suitable power device. This sudden interruption of the forward advancement of the tool 10 is accompanied by continued forward movement of the cylindrical member 20 as shown in FIG. 4. The momentum or kinetic energy of the cylindrical member 20 causes it to continue its forward movement so as to cause the driving section 20a thereof to enter the aperture 10b and to impinge the trailing extremity of the rivet expanding pin 24 with sufficient force to drive said pin into complete telescopic association with the rivet shank 10a. As a result, the advancing extremity of the pin 24 causes expansion of the entering extremity of the rivet shank 22a as shown in FIG. 4.

It will therefore be apparent that applicant has provided the simple expediency of a freely shiftable or floating cylindrical pin driving member within the chamber of an elongate tool member. The only power required to propel said pin driving member forwardly is the momentum or kinetic energy developed therein, as a result of the relatively rapid forward advancement of the tool member. Thus, the present invention precludes the necessity of employing relatively expensive and structurally complicated auxiliary hydraulic or pneumatic devices heretofore used to force a rivet expanding pin into a rivet shank. Applicant's novel apparatus and method facilitates expeditious piercing and contemporaneous setting of a rivet at minimum cost and with minimum effort.

I claim:

1. Apparatus for driving and setting a work piercing fastener rivet of the type comprising a shank expanding pin member associated with a headed rivet shank having an expandable entering extremity, an elongate rivet driving tool, means for axially advancing the driving tool, said driving tool having a longitudinal chamber communicating at the driving extremity thereof with a pin accommodating aperture, abutment means in said chamber spaced axially from said aperture, an annular rivet engaging surface extending radially outwardly from said aperture, and a pin driving member freely shiftable longitudinally within said chamber between said abutment means and said aperture, the driving extremity of said pin driving member being adapted for telescopic association with said aperture and driving engagement with the end of a shank expanding pin member associated with said aperture, said rivet driving tool and means for advancing said tool including complementary abutment means for limiting the advancing movement of the tool when the rivet shank has been fully driven into a workpiece, wherein the freely shiftable pin driving member continues to advance to drive the shank expanding pin into the rivet shank.

2. Apparatus for driving and setting a work piercing fastener rivet as set forth in claim 1, wherein the abutment means in said chamber spaced axially from the aperture is in the form of a wall surface traversing the inner extremity of the longitudinal chamber.

3. Apparatus for driving and setting a work piercing fastener rivet as set forth in claim 1, wherein the chamber is bounded at each extremity by abutment means for limiting the extent of reciprocable travel of the longitudinally shiftable pin driving member.

4. Apparatus for driving and setting a work piercing fastener rivet as set forth in claim 1, wherein the forward extremity of the pin driving member is provided with a pin engaging section of reduced diameter adapted to be received by the pin accommodating aperture.

5. Apparatus for driving and setting a work piercing fastener rivet as set forth in claim 1, wherein the elongate rivet driving tool includes an elongate cylindrical section having the chamber at the forward extremity thereof, and abutment means in the vicinity of the opposite extremity projecting outwardly from the periphery of said cylindrical section for engaging the complementary fixed abutment means in the means for advancing the driving means after an associated rivet has been completely inserted within a workpiece.

* * * * *